United States Patent [19]
Akiyama

[11] Patent Number: 6,120,156
[45] Date of Patent: Sep. 19, 2000

[54] OPTICAL ELEMENT AND OPTICAL SYSTEM HAVING THE SAME

[75] Inventor: Takeshi Akiyama, Yokohama, Japan

[73] Assignee: Canon Kabushiki Kaisha, Tokyo, Japan

[21] Appl. No.: 09/172,167

[22] Filed: Oct. 14, 1998

[30] Foreign Application Priority Data

Oct. 16, 1997 [JP] Japan .................................. 9-299572

[51] Int. Cl.$^7$ .................................................. G02B 5/08
[52] U.S. Cl. .......................... 359/857; 359/858; 359/861; 359/365; 359/630; 359/631; 359/632; 359/633
[58] Field of Search ................................. 359/857, 858, 359/859, 861, 365, 364, 366, 631, 629, 630, 632, 633, 850, 834, 727, 729, 731, 732; 354/403, 409, 478; 382/321

[56] References Cited

U.S. PATENT DOCUMENTS

| | | | |
|---|---|---|---|
| 3,674,334 | 7/1972 | Offner | 359/366 |
| 4,265,510 | 5/1981 | Cook | 359/366 |
| 4,691,999 | 9/1987 | Wheeler | 359/630 |
| 4,737,021 | 4/1988 | Korsch | 359/366 |
| 4,775,217 | 10/1988 | Ellis | 313/524 |
| 5,063,586 | 11/1991 | Jewell et al. | 378/34 |
| 5,309,276 | 5/1994 | Rodgers | 359/366 |
| 5,768,025 | 6/1998 | Togino et al. | 359/633 |
| 5,790,311 | 8/1998 | Togino | 359/630 |
| 5,790,312 | 8/1998 | Togino | 359/631 |

FOREIGN PATENT DOCUMENTS

| | | |
|---|---|---|
| 0 730 169 | 9/1996 | European Pat. Off. . |
| 2-297516 | 12/1990 | Japan . |
| 5-12704 | 1/1993 | Japan . |
| 6-139612 | 5/1994 | Japan . |
| 9-258104 | 10/1997 | Japan . |

*Primary Examiner*—Mohammad Y. Sikder
*Attorney, Agent, or Firm*—Fitzpatrick, Cella, Harper & Scinto

[57] ABSTRACT

An optical element has a plurality of reflecting regions for reflecting light in succession, each of the plurality of reflecting regions comprises a curved surface, at least two of the reflecting regions has a common reflecting surface, and the optical paths of the light defined by the plurality of reflecting regions intersect with one another.

11 Claims, 11 Drawing Sheets

OPTICAL ELEMENT AND OPTICAL SYSTEM HAVING THE SAME

BACKGROUND OF THE INVENTION

1. Field of the Invention

This invention relates to an optical element and an optical system having the same, and particularly to an optical element provided, for example, with incidence and emergence surfaces and a plurality of reflecting surfaces on the surface of a transparent member, and an optical system having the same. This optical element and this optical system are suitable for image pickup apparatuses, such as a video camera, a still video camera and a copying apparatus for forming an object image on the surface of an image pickup element.

2. Related Background Art

There have heretofore been proposed various phototaking optical systems utilizing a reflecting surface such as a concave mirror or a convex mirror. FIG. 11 of the accompanying drawings is a schematic view of a so-called mirror optical system comprising a concave mirror and a convex mirror.

In the mirror optical system of FIG. 11, an object light beam 104 from an object is reflected by a concave mirror 101, travels toward the object side while being converged, and is reflected by a convex mirror 102, whereafter it is imaged on an image plane 103.

This mirror optical system uses the construction of a so-called Cassegrainian reflecting telescope as its basis, but shortens the full length of the optical system by folding the optical path of a telephoto lens system of a long full lens length comprised of a refracting lens, by the use of two reflecting mirrors opposed to each other.

Also, in an objective lens system constituting a telescope, for a similar reason, a number of types shorten the full length of the optical system by the use of a plurality of reflecting mirrors.

Thus, by using reflecting mirrors instead of a photo-taking lens of a long full lens length, the optical path has heretofore been efficiently folded to thereby obtain a compact mirror optical system.

Generally, however, in a mirror optical system such as a Cassegrainian reflector, there is the problem that part of an object ray of light is eclipsed by the convex mirror 102. This problem is attributable to the fact that the convex mirror 102 is in the passage area of the object light beam 104.

In order to solve this problem, there has also been proposed a mirror photo-taking optical system which uses an eccentric reflecting mirror to prevent another portion of the optical system from shielding the passage area of the object light beam 104, i.e., to separate the principal ray of the light beam from an optical axis 105.

FIG. 12 of the accompanying drawings is a schematic view of a mirror photo-taking optical system disclosed in U.S. Pat. No. 3,674,334, and this optical system solves the above-mentioned eclipse problem by making the center axis itself of a reflecting mirror eccentric relative to the optical axis to thereby separate the principal ray of the object light beam from the optical axis.

The mirror optical system of FIG. 12 has a concave mirror 111, a convex mirror 113 and a concave mirror 112 in the order of passage of the light beam, and each of them originally is a reflecting mirror, rotation-symmetrical with respect to an optical axis 114, as indicated by dots-and-dash lines. Use is made of only the upper portion of the concave mirror 111 with respect to the optical axis 114, only the lower portion of the convex mirror 113 with respect to the optical axis 114, and only the lower portion of the concave mirror 112 with respect to the optical axis, as viewed in the plane of the drawing sheet of FIG. 12, whereby there is constructed an optical system in which the principal ray 116 of an object light beam 115 is separated from the optical axis 114 and the eclipse of the object light beam 115 is eliminated.

FIG. 13 of the accompanying drawings is a schematic view of a mirror optical system disclosed in U.S. Pat. No. 5,063,586. The mirror optical system of FIG. 13 solves the above-noted problem by making the center axis itself of a reflecting mirror eccentric relative to an optical axis to thereby separate the principal ray of an object light beam from the optical axis.

In FIG. 13, when the vertical axis of an object surface 121 is defined as an optical axis 127, the central coordinates and center axes of the reflecting surfaces of a convex mirror 122, a concave mirror 123, a convex mirror 124, and a concave mirror 125 in the order of passage of the light beam (axes linking the centers of the reflecting surfaces and the centers of curvature of those surfaces together) 122a, 123a, 124a and 125a are eccentric relative to the optical axis 127. In FIG. 13, the amounts of eccentricity at this time and the radius of curvature of each surface are appropriately set to thereby prevent the eclipse of the object light beam 128 by each reflecting mirror and to cause an object image to be efficiently formed on an imaging plane 126.

Besides, U.S. Pat. No. 4,737,021 and U.S. Pat. No. 4,265,510 also disclose a construction using a portion of a reflecting mirror rotation-symmetrical with respect to an optical axis to avoid eclipse, or a construction in which the center axis itself of a reflecting mirror is made eccentric relative to an optical axis to thereby avoid eclipse.

FIG. 14 of the accompanying drawings shows an afocal optical system for observation using four reflecting surfaces, which is disclosed in U.S. Pat. No. 5,309,276. In FIG. 14, third and fourth mirrors 203 and 204 are disposed so that a light beam from an object may be reflected by a first mirror 201, a second mirror 202 and the third mirror 203 and may pass the front of the first mirror 201 twice, and then may emerge perpendicular to the incident light and may be imaged on a pupil 205. An observer's pupil is situated at 205.

As optical elements in which a number of reflecting surfaces are made into a block, there have heretofore been developed optical prisms, such as a pentagonal roof prism which are and a porro prism used, for example, in a finder system or the like.

In these prisms, a plurality of reflecting surfaces are formed as a unit and therefore, the relative positional relation between the reflecting surfaces is made with good high accuracy, and positional adjustment between the reflecting surfaces becomes unnecessary. However, the main function of these prisms is to change the direction of travel of a ray of light to thereby effect the reversal of an image, and each reflecting surface is constituted by a flat surface.

In contrast with this, there is also known a photo-taking optical system in which a curvature (refractive power) is given to the reflecting surface of a prism.

FIG. 15 of the accompanying drawings is a schematic view of the essential portions of an observation optical system disclosed in U.S. Pat. No. 4,775,217. This observation optical system observes a scene in the external world and also observes a display image displayed on an information display member in overlapping relationship with the scene.

In this observation optical system, a display light beam 145 emerging from the display image on an information display member 141 enters from the incidence surface 148 of a prism member, is reflected by a surface 142, travels toward the object side and enters a concave surface 143 comprising a half mirror. It is then reflected by this concave surface 143, whereafter the display light beam 145 is made into a substantially parallel light beam by the refractive power of the concave surface 143, and is refracted by and transmitted through the surface 142, whereafter it enters an observer's pupil 144 and makes the observer recognize the enlarged virtual image of the display image.

On the other hand, an object light beam 146 from the object enters a surface 147 substantially parallel to the reflecting surface 142, is refracted thereby and arrives at a concave surface 143 comprising a half mirror. Half-transmitting film is deposited by evaporation on the concave surface 143, and a part of the object light beam 146 is transmitted through the concave surface 143 and is refracted by and transmitted through the surface 142, whereafter it enters the observer's pupil 144. Thereby, the observer visually confirms the display image in overlapping relationship with the scene in the external world.

FIG. 16 of the accompanying drawings is a schematic view of the essential portions of an observation optical system disclosed in Japanese Laid-Open Patent Application No. 2-297516. This observation optical system also observes a scene in the external world and observes a display image displayed on an information display member in overlapping relationship with the scene.

In this observation optical system, a display light beam 154 emerging from an information display member 150 is transmitted through a flat surface 157 constituting a prism Pa, enters the prism Pa and impinges on a reflecting surface 151 comprising a parabolic surface. The display light beam 154 is reflected by this reflecting surface 151 and becomes a convergent light beam, and is imaged on a focal plane 156. The display light beam 154 reflected by the reflecting surface at this time arrives at the focal plane 156 while being totally reflected between two parallel flat surfaces 157 and 158 constituting the prism Pa, whereby the thinning of the entire optical system is achieved.

Next, the display light beam 154 having emerged as divergent light from the focal plane 156 enters a half mirror 152 comprising a parabolic surface while being totally reflected between the flat surface 157 and the flat surface 158, and is reflected by this half mirror surface 152 and at the same time, forms the enlarged virtual image of the display image by the refractive power thereof and becomes a substantially parallel light beam, and is transmitted through the surface 157 and enters an observer's pupil 153 to thereby make the observer recognize the display image.

On the other hand, an object light beam 155 from the external world is transmitted through a surface 158b constituting a prism Pb, is transmitted through the half mirror 152 comprising a parabolic surface, is transmitted through the surface 157 and enters the observer's pupil 153. The observer visually confirms the display image in overlapping relationship with the scene in the external world.

Further, as examples using an optical element as the reflecting surface of a prism, there are optical heads for optical pickup disclosed, for example, in Japanese Laid-Open Patent Application No. 5-12704, Japanese Laid-Open Patent Application No. 6-139612, etc. These are such that light from a semiconductor laser is reflected by a Fresnel surface or a hologram surface, whereafter it is imaged on the surface of a disc, and the reflected light from the disc is directed to a detector.

On the other hand, the assignee, as shown in FIG. 17 of the accompanying drawings, has proposed a mirror optical system whose downsizing is achieved by the use of an optical element in which a plurality of curved reflecting mirrors or flat reflecting surfaces are formed as a unit and yet in which the disposition accuracy (assembly accuracy) of the reflecting mirrors liable to be in the mirror optical system is made loose. In FIG. 17, reference numeral 51 designates an example of an optical element in which a plurality of curved reflecting surfaces having curvatures are formed as a unit, i.e., an optical element comprising, in succession from the object side, a concave refracting surface R2, five reflecting surfaces such as a concave mirror R3, a convex mirror R4, a concave mirror R5, a convex mirror R6 and a concave mirror R7, and a convex refracting surface R8, and the direction of a reference axis entering the optical element 51 and the direction of a reference axis emerging from the optical element 51 are substantially parallel and opposite to each other. Reference numeral 52 denotes an optical correcting plate, such as a rock crystal low-pass filter or an infrared cut filter, reference numeral 53 designates the surface of an image pickup element such as a CCD, reference numeral 54 denotes a stop disposed on the object side of the optical element 51, and reference numeral 55 designates the reference axis of a photo-taking optical system.

Describing the imaging relation in FIG. 17, light 56 from the object has its quantity of incident light regulated by the stop 54, and thereafter enters the concave refracting surface R2 of the optical element 51.

The light having entered the concave refracting surface R2 is reflected by the concave mirror R3 after the object light 56 is made into divergent light by the power of the concave refracting surface R2, and primarily forms an object image on an intermediate imaging plane N1 by the power of the concave mirror.

The object light 56 primarily imaged on the intermediate imaging plane N1 repeats reflection by the convex mirror R4, the concave mirror R5, the convex mirror R6 and the concave mirror R7 and comes to the convex refracting surface R8 while being affected by the power of each reflecting mirror, and the object light 56, refracted by the power of the convex refracting surface R8, forms an object image on the image pickup element surface 53.

As described above, the optical element 51 functions as a lens unit having a desired optical performance and positive power as a whole while repeating the refraction by the incidence and emergence surfaces and the reflection by the plurality of curved reflecting mirrors having curvatures.

A mirror optical system of this kind is also disclosed in Japanese Laid-Open Patent Application No. 9-258104.

SUMMARY OF THE INVENTION

The present invention relates to improvements in the optical elements and optical systems shown in FIG. 17 and the above-mentioned Japanese Laid-Open Patent Application No. 9-258104, and has as its object to provide an optical element more compact than these optical elements and an optical system more compact than these optical systems.

A certain optical element of the present invention has a plurality of reflecting regions for reflecting light beam in succession, wherein the light beam having a reference axis which passes through center of a pupil. The plurality of reflecting regions each comprise a curved surface, at least two the reflecting regions having a common reflecting surface, and optical path of the reference axis of the light beam defined by the plurality of reflecting regions intersecting itself one another.

Also, another optical element of the present invention has a plurality of reflecting regions for reflecting light in succession, at least two the reflecting regions having a common reflecting surface, optical paths (reference axes) of the light which are defined by the plurality of reflecting regions intersecting one another. Each reflecting surface constituting the plurality of reflecting regions is inclined with respect to its reference axis and is an aspherical surface having not more than two symmetrical planes each capable of defining a pair of surfaces symmetrical with respect to the reference axis. This aspherical surface is represented by expression (1) appearing in the following detailed description of the invention, and is designed on the basis of this expression (1).

Another optical element of the present invention has a plurality of reflecting regions for reflecting light in succession. The plurality of reflecting regions each comprise a curved surface, at least two of the reflecting regions have a common reflecting surface, and the positions of a reference axis in the two reflecting regions have the common reflecting surface coincide with each other.

Another optical element of the present invention has a plurality of reflecting regions for reflecting light in succession. At least two of the reflecting regions have a common reflecting surface. The positions of a reference axis in the two reflecting regions have the common reflecting surface coincide with each other. Each reflecting surface constituting the plurality of reflecting regions is inclined with respect to its reference axis and is an aspherical surface having not more than two symmetrical planes, each capable of defining a pair of surfaces symmetrical with respect to the reference axis. This aspherical surface is represented by expression (1) appearing in the following detailed description of the invention, and is designed on the basis of this expression (1).

In each of the above-described optical elements, the plurality of reflecting regions are provided on the surface of a transparent member, and there is an element in which the light having entered the interior of the transparent member from a certain area of the transparent member is reflected by the plurality of reflecting regions in succession and propagates through the interior of the transparent member, and thereafter emerges from another area of the transparent member, or an element of hollow structure comprising a plurality of reflecting mirrors defining the plurality of reflecting regions (the number of the mirrors being smaller by one or more than the number of the reflecting regions).

In each of the above-described optical elements, there are a configuration in which the positions of the reference axes in the two reflecting regions having the common reflecting surface coincide with each other and a configuration in which the positions of the reference axes do not coincide with each other.

The optical system of the present invention has one or more of the above-described elements.

The apparatus of the present invention has one or more of the above-described optical elements. In this apparatus, the optical element is a constituent of an optical system, for example, for photographing, observation or measurement.

DESCRIPTION OF THE PREFERRED EMBODIMENTS

Before starting the description of some embodiments of an optical system (photo-taking optical system) using the optical element of the present invention, the way of representing the numerical values of the construction of the optical element of the present embodiment and the common items of the entire embodiment will hereinafter be described with reference to FIG. 10.

Figure 10:
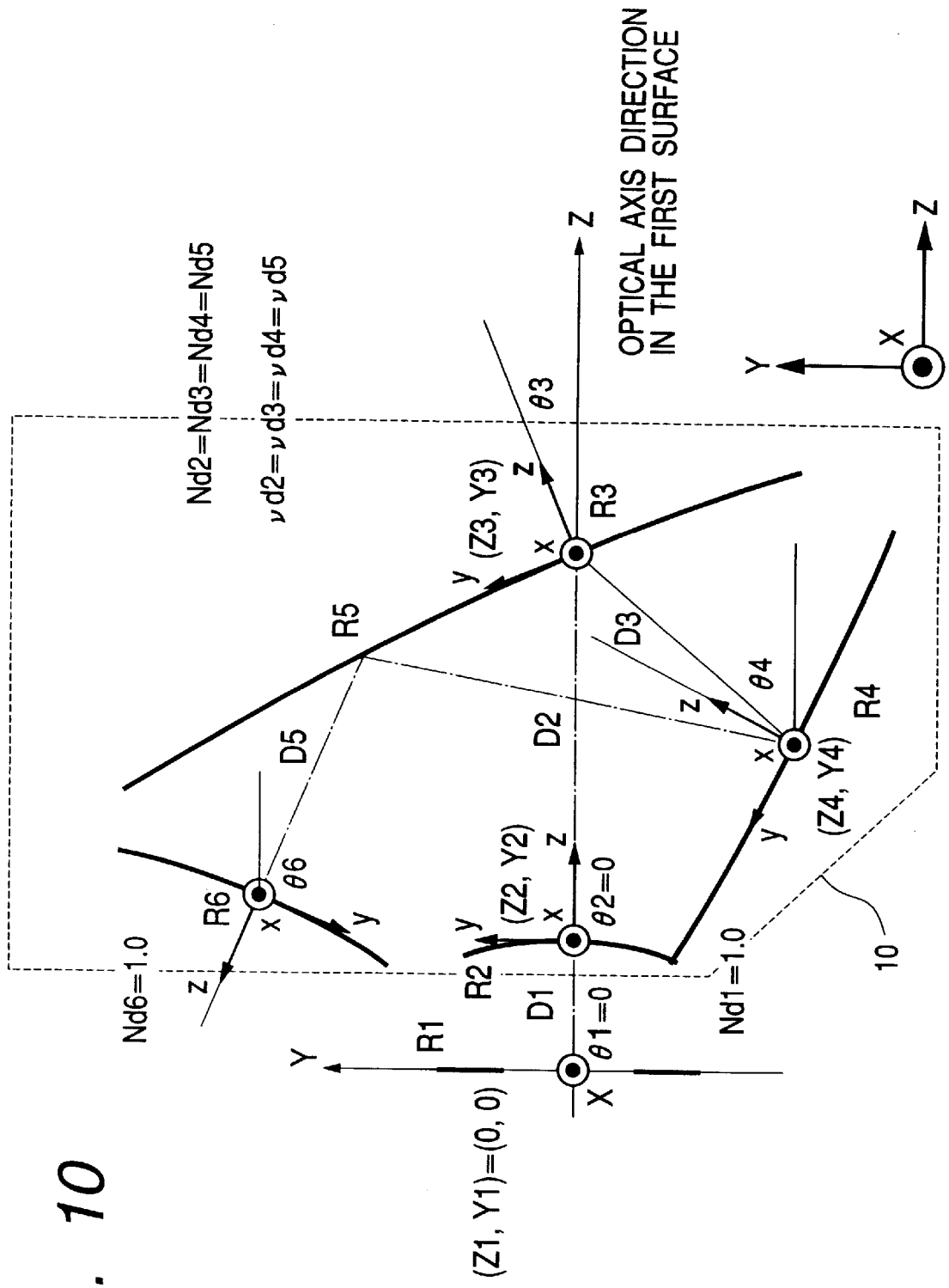
FIG. 10 is an illustration of the coordinates system in an embodiment of the present invention.
Figure 11:
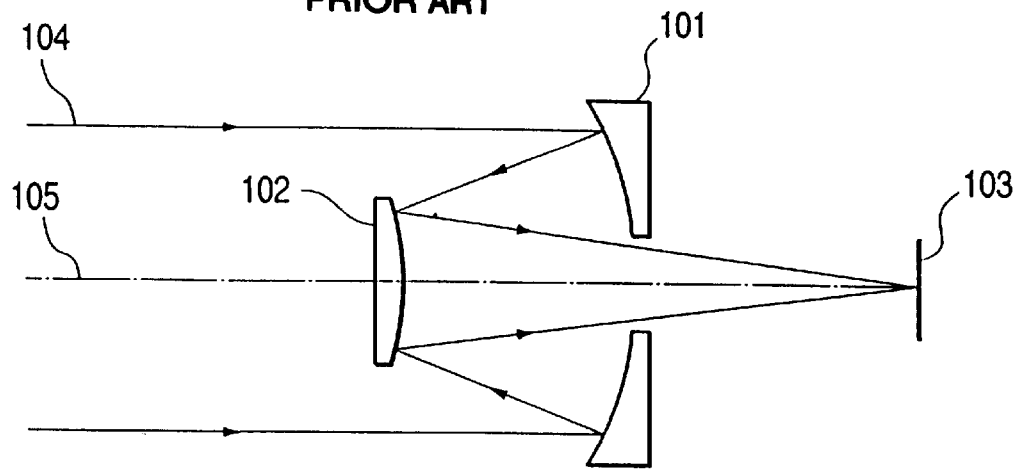
FIG. 11 is an illustration of a Cassegrainian reflector according to the prior art.
Figure 12:
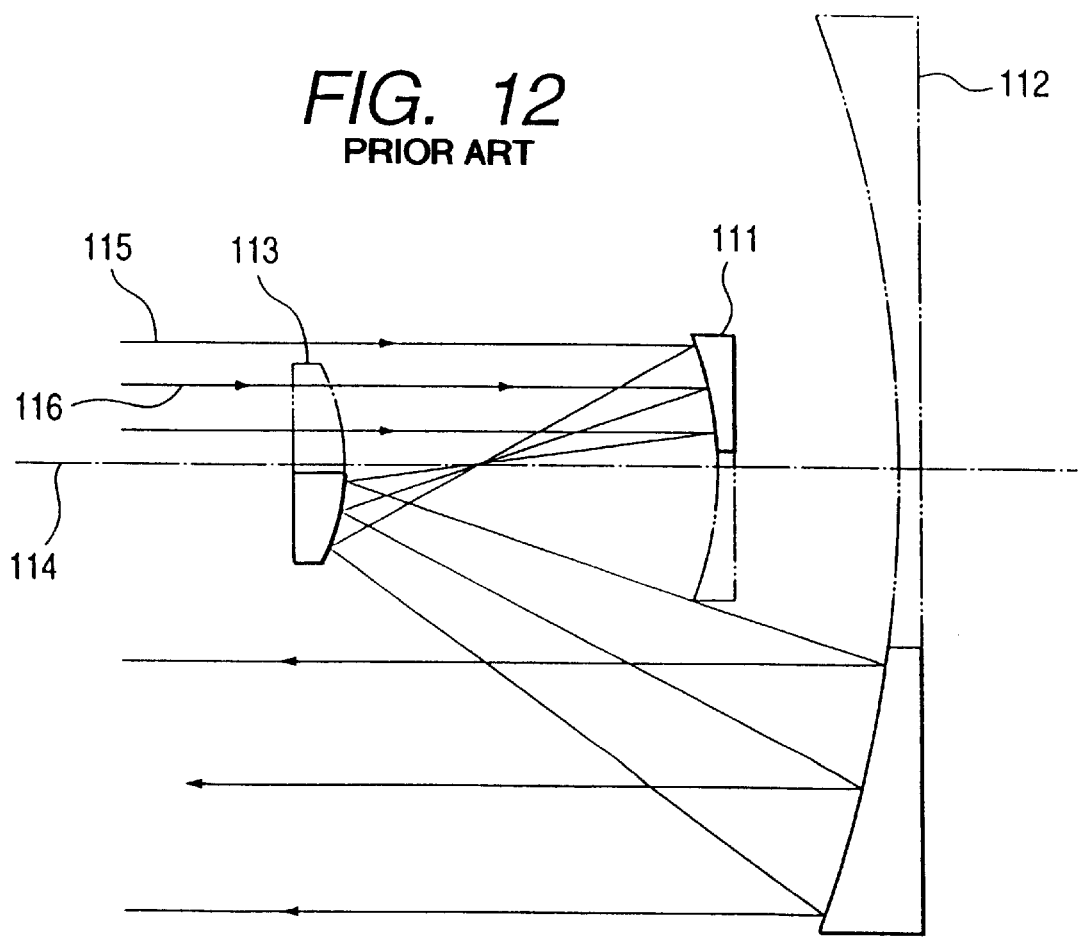
FIG. 12 is a schematic view of the essential portions of a reflection type optical system according to the prior art.
Figure 13:
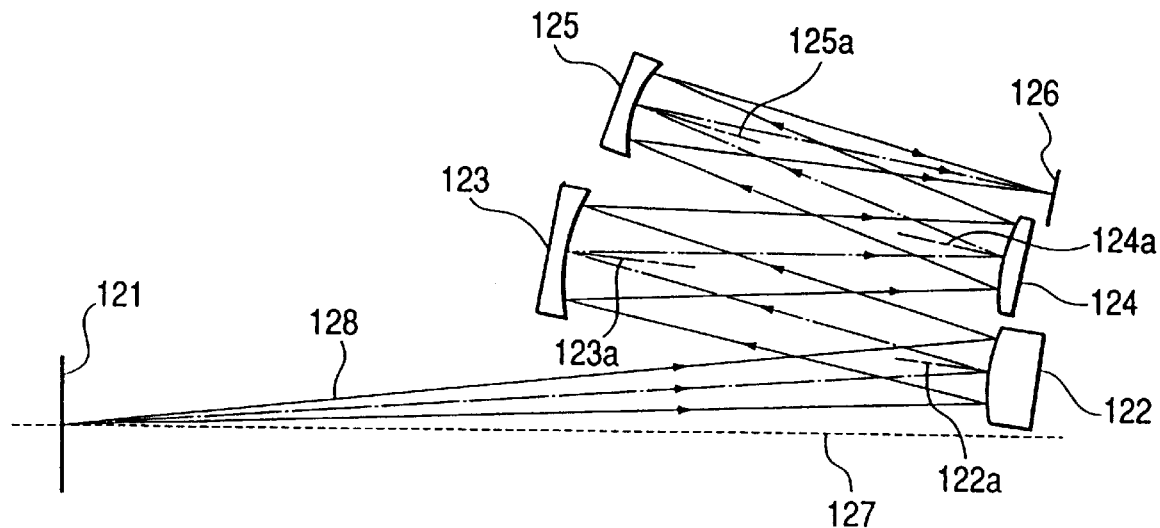
FIG. 13 is a schematic view of the essential portions of a reflection type optical system according to the prior art.
Figure 14:
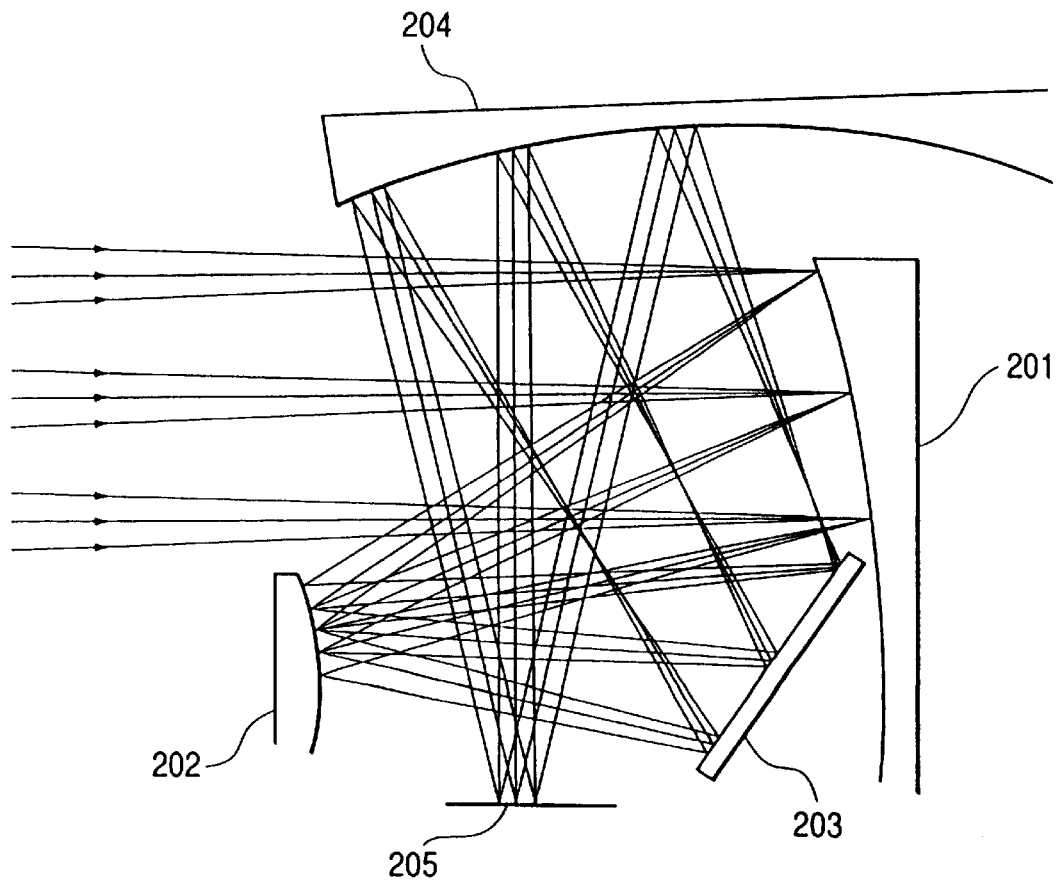
FIG. 14 is a schematic view of the essential portions of a reflection type optical system according to the prior art.
Figure 15:
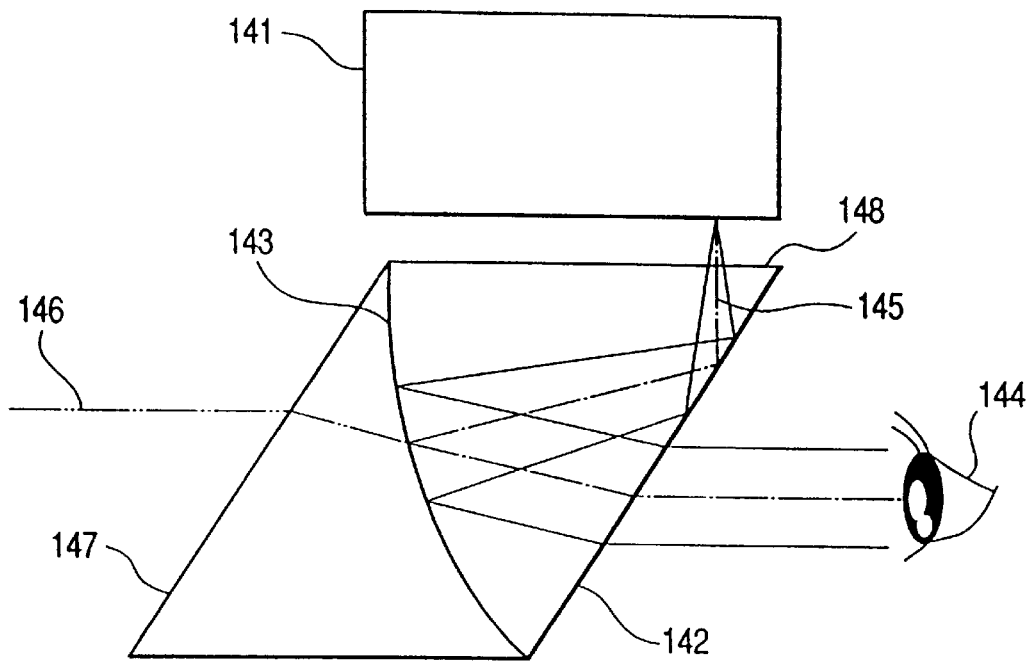
FIG. 15 is a schematic view of the essential portions of a reflection type optical system having a prism reflecting surface according to the prior art.
Figure 16:
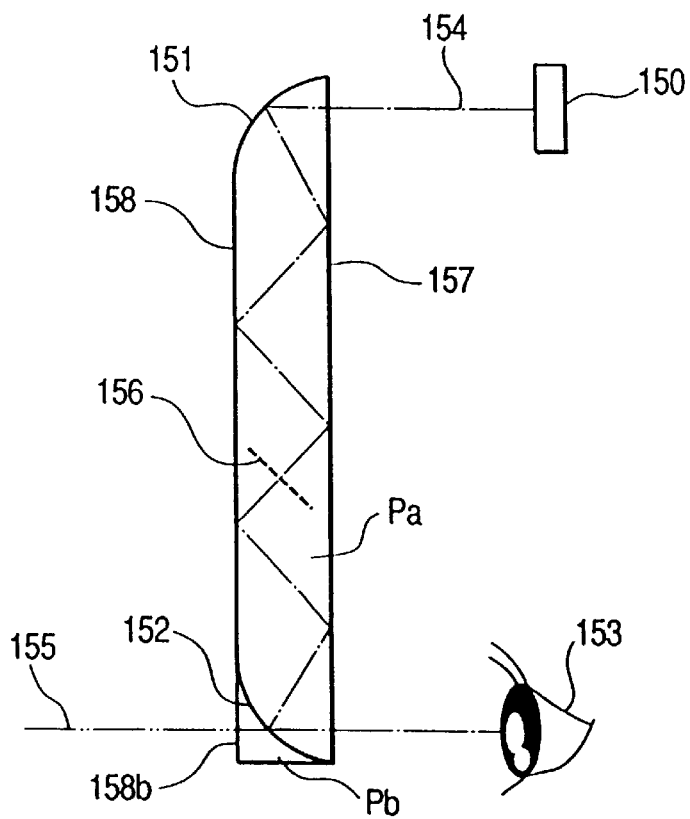
FIG. 16 is a schematic view of the essential portions of a reflection type optical system having a prism reflecting surface according to the prior art.
Figure 17:
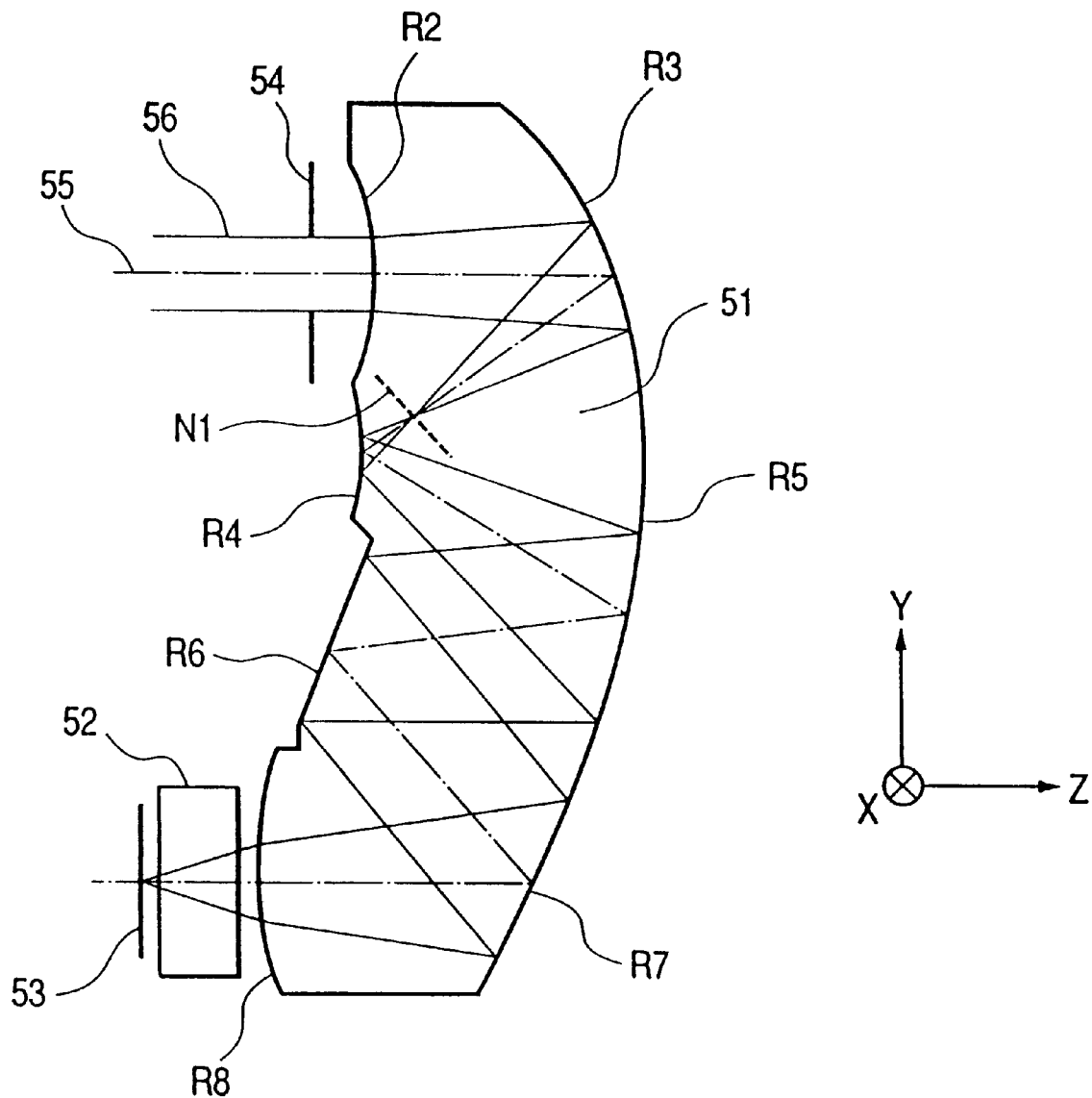
FIG. 17 is a schematic view of the essential portions of a reflection type optical system according to the prior art.

FIG. 10 is an illustration of a coordinates system defining the data of the construction of a photo-taking optical system (optical system) using the optical element of the present invention. In the embodiment of the present invention, the i-th surface along a ray of light (indicated by a dot-and-dash line in FIG. 10 and hereinafter referred to as the reference axis ray of light) travelling from the object side to the image plane is defined as the i-th surface.

In FIG. 10, a first surface R1 is a stop, a second surface R2 is a refracting surface coaxial with the first surface R1, a third surface R3 is a reflecting surface tilted with respect to the second surface R2, a fourth surface R4 and a fifth surface R5 are reflecting surfaces shifted and tilted with respect to their respective preceding surfaces, and a sixth surface R6 is a refracting surface shifted and tilted with respect to the fifth surface R5. The second surface R2 to the sixth surface R6 are constructed on the surface of a transparent member formed of a medium such as glass or plastic, and constitute an optical element 10.

In the construction of FIG. 10, the medium from an object surface, not shown, to the second surface R2 is air, the medium from the second surface R2 to the sixth surface R6 is a certain common medium, and the medium from the sixth surface R6 to a seventh surface R7, such as a lens surface or a reflecting surface or an imaging surface, not shown, is air.

The photo-taking optical system of the present invention is an eccentric optical system and therefore, the surfaces constituting the optical system do not have a common optical axis. So, in the embodiments of the present invention, an absolute coordinate system having the center of the effective diameter of a ray of light on the first surface R1 as the origin is first set.

In the embodiments of the present invention, the central point of the effective diameter of the ray of light on the first surface R1 is defined as the origin TO and also, the route of a ray of light (reference axis ray of light) passing through the origin and the center of the final imaging plane is defined as the reference axis ST of the optical system. Further, the reference axis ST in the present embodiment has a direction. This direction is such that the direction in which the reference axis ray of light travels during imaging is positive.

In the embodiments of the present invention, the reference axis, which provides the reference of the optical system, is set as described above, but the axis which provides the reference of the optical system can be determined by adopting an axis convenient in optical design, the arrangement of aberrations, or the expression of the shapes of the surfaces constituting the optical system. For example, the route of a ray of light passing through the center of the image plane and the entrance pupil or the exit pupil or the center of the first surface of the optical system or the center of the last surface of the optical system may be set as the reference axis, which is the reference of the optical system.

In the embodiments of the present invention, the reference axis is set to the route along which the ray of light (reference axis ray of light), passing through the central point of the effective diameter of the ray of light on the first surface R1, i.e., the stop surface, and coming to the center of the final imaging plane, is refracted and reflected by each refracting surface and each reflecting surface. The order of the surfaces is set to the order in which the reference axis ray of light is subjected to refraction or reflection.

Accordingly, the reference axis passing through the center of the stop (surface) finally arrives at the center of the image plane while having its direction changed along the set order of the surfaces in accordance with the law of refraction or reflection.

Figure 1:
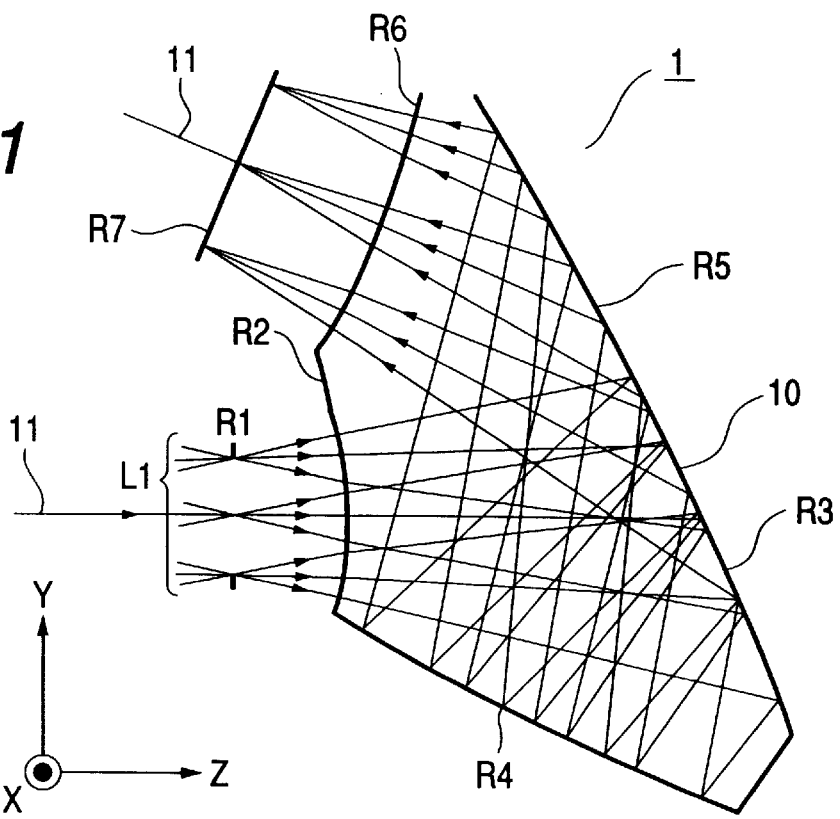
FIG. 1 is a schematic view of the YZ cross-section of Embodiment 1 of the present invention.

The tilted surfaces, such as tilted reflecting surfaces and tilted refracting surfaces constituting the optical system of each embodiment of the present invention, are all tilted in the same plane basically. So, the axes of the absolute coordinates system (X, Y, Z) are defined as follows:

Z-axis: the reference axis passing through the origin TO toward the second surface R2;

Y-axis: a straight line passing through the origin TO and counter-clockwise forming an angle of 90° with respect to the X-axis in a tilt plane (the plane of the drawing sheet of FIG. 1); and X-axis: a straight line passing through the origin TO and perpendicular to the Z-axis and the Y-axis (a straight line perpendicular to the plane of the drawing sheet of FIG. 1).

Also, to represent the surface shape of the i-th surface constituting the optical system, it is more understandable in recognizing the shape to set a local coordinate system having the point at which the reference axis ST and the i-th surface intersect with each other as the origin, and represent the surface shape of that surface by the local coordinate system than to represent the shape of that surface by the absolute coordinate system (X, Y, Z) and therefore, when the construction data of the optical system of the present invention is to be indicated, the surface shape of the i-th surface is represented by the local coordinate system.

In the present invention, however, a certain surface is a portion of an effective region and a light beam is reflected thereon a plurality of times. At that time, on that surface, the reference point in the case of the first reflection and the reference point in the case of the second or subsequent reflection do not always coincide with each other.

That is, in some cases, the reference point and the origin of the local coordinates system do not coincide with each other.

In such a case, the second and subsequent reflecting surfaces are described in the construction data of the optical system, but it should be noted that they are the same as the first reflecting surface.

Also, the angle of tilt of the i-th surface in the YZ plane is represented by an angle $\theta i$ (the unit being degree (°)) in which the counter-clockwise direction relative to the Z-axis of the absolute coordinates system is positive. Consequently, in the embodiments of the present invention, the origin of the local coordinates of each surface is on the YZ plane in FIG. 1. There is no eccentricity of the surface in the XZ plane and the XY plane. Further, the y-axis and z-axis of the local coordinates (x, y, z) of the i-th surface are inclined by the angle $\theta i$ in the YZ plane with respect to the absolute coordinates system (X, Y, Z), and specifically are set as follows:

z-axis: a straight line passing through the origin of the local coordinates and counter-clockwise forming the angle $\theta i$ in the YZ plane with respect to the Z-axis of the absolute coordinates system; p1 y-axis: a straight line passing through the origin of the local coordinates and counter-clockwise forming 90° in the YZ plane with respect to the Z-axis;

x-axis: a straight line passing through the origin of the local coordinates and perpendicular to the YZ plane.

Also, Di is a scalar amount representing the spacing between the origins of the local coordinates of the i-th surface and the (i+1)th surface, and Ndi and Vdi are the refractive index and Abbe number, respectively, of the medium between the i-th surface and the (i+1)th surface. The stop and the final imaging plane each are also indicated as a plane.

In some cases, the reference axis and the origin of the local coordinates do not coincide with each other, and in such cases, Di is meaningless and therefore is not shown.

A certain embodiment of the optical system of the present invention has at least one spherical surface and one or more rotation-asymmetrical aspherical surfaces. The spherical portion has its radius of curvature Ri written as a spherical shape. The sign of the radius of curvature Ri is minus when the center of curvature is on the first surface side along a reference axis (a dot-and-dash line in FIG. 1) travelling from the first surface to the image plane, and is plus when the center of curvature is on the imaging plane side.

The spherical surface is of a shape represented by the following expression:

$$Z = \frac{(x^2 + y^2)/Ri}{1 + \{1 - (x^2 + y^2)/Ri^2\}^{1/2}}.$$

Also, the aforementioned rotation-asymmetrical aspherical surface in the present invention can be expressed by the following expression (1):

Assuming that $$A=(a+b)\cdot(y^2\cdot\cos^2 t+x^2)$$

$$B=2a\cdot b\cdot\cos t[1+\{(b-a)\cdot y\cdot\sin t/(2a\cdot b)\}+[1$$

$$+\{(b-a)\cdot y\cdot\sin t/(a\cdot b)\}-\{y^2/(a\cdot b)\}-\{4a\cdot b\cdot\cos^2 t+(a+b)^2\sin^2 t\}x^2/(4a^2b^2\cos^2 t)]^{1/2}],$$

$$Z=A/B+C02y^2+C11xy+C20x^2+C03y^3+C12xy^2+C21x^2y+C04y^4+C13xy^3+C22x^2y^2+C31x^3y+C40x^4+\ldots \quad (1)$$

The shape of the rotation-asymmetrical aspherical surface in the present invention is a surface-symmetrical shape in which the yz plane alone is made into a symmetrical plane by rendering the odd-order terms into 0 by the use of only the even-order terms regarding x in the above-mentioned curved surface expression. Also, at this time, the following conditions are satisfied:

$$C03\neq C21\neq t\neq 0.$$

Further, $$C02\neq C20 C04\neq C40\neq C22/2.$$

In the present invention, use can also be made of an aspherical surface having no symmetrical surface.

Each embodiment of the present invention shows a case where as in FIG. 10, the first surface is a stop. Also, the horizontal half angle of view uY is the maximum angle of view of a light beam entering the stop R1 in the YZ plane of FIG. 10, and the vertical half angle of view uX is the maximum angle of view of a light beam entering the stop R1 in the XZ plane. Also, the diameter of the opening in the stop R1, which is the first surface, is indicated as the diameter of the stop. This is related to the brightness of the optical system. In such an optical system, the entrance pupil is located in the first surface and therefore, the diameter of the entrance pupil is equal to the aforementioned diameter of the stop.

Also, in numerical value embodiments, what relates to the imaging at a finite distance shows brightness by the object side numerical value opening=numerical aperture. Also, the effective image range on the image plane is shown as the image size. The image size is represented by a rectangular area in which the size in the y-direction of the local coordinates is horizontal and the size in the x-direction of the local coordinates is vertical.

Also, the size of the optical system is shown in each embodiment. The size is a size defined by the effective diameter of the ray of light.

Also, regarding each embodiment in which the construction data are mentioned, the lateral aberrations thereof are shown. The lateral aberration graphs in the respective embodiments show the lateral aberrations of light beams in the y-direction and the x-direction in the cases that the horizontal angle of incidence and the vertical angle of incidence onto the stop R1 are (uY, uX), (0, uX), (−uY, uX), (uY, 0), (0, 0) and (−uY, 0), respectively. In the lateral aberration graphs, the axis of the abscissas represents the incidence height onto the pupil, and the ordinate axis represents the amount of aberration. In each embodiment, basically each surface is of a surface-symmetrical shape in which the yz plane is a symmetrical plane and therefore, in the aberration graphs, the plus and minus directions of the vertical angle of view are the same and thus, for the simplification of the showing, the aberration graph in the minus direction is omitted.

A description will now be provided of each embodiment of the optical element of the present invention and an optical system (photo-taking optical system) having the same.

Figure 2:
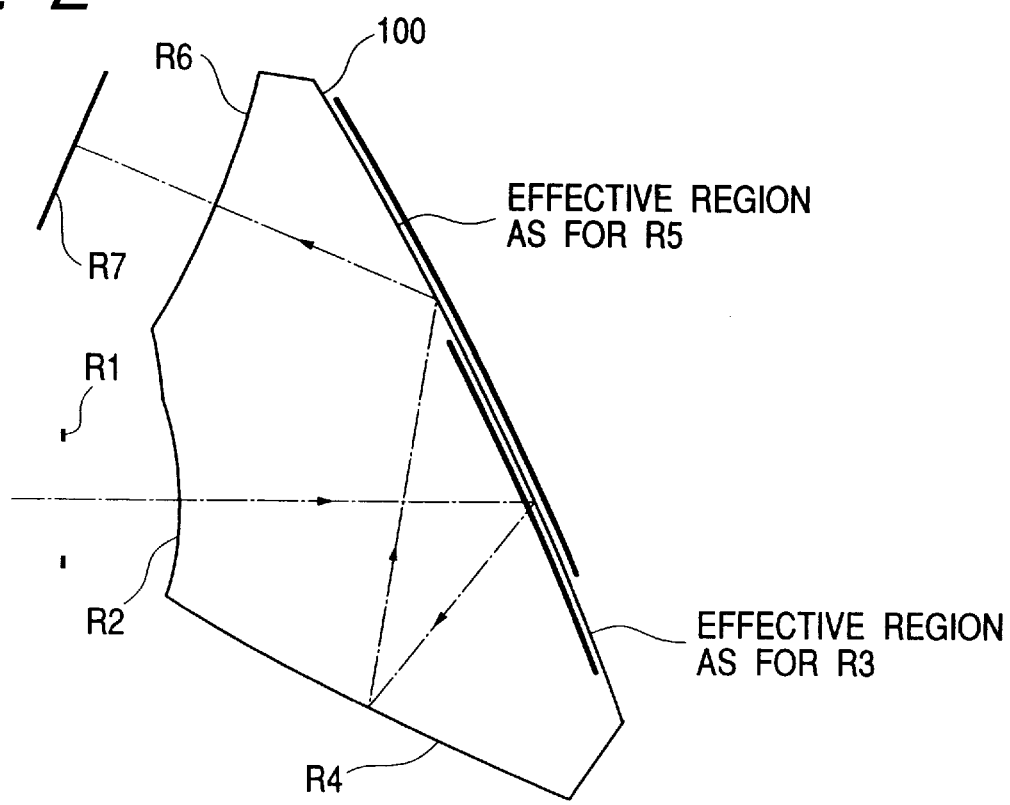
FIG. 2 is a schematic view of the YZ cross-section of Embodiment 1 of the present invention.

FIGS. 1 and 2 are schematic views, in YZ cross-section, of Embodiment 1 when the optical element of the present invention is applied to a photo-taking optical system. In the Embodiment 1, the photo-taking angle of view is made such that a horizontal half angle of view is 12.2 degrees and a vertical half angle of view is 16.1 degrees.

In FIGS. 1 and 2, reference numeral 1 designates a photo-taking optical system. Reference numeral 10 denotes an optical element having a plurality of curved reflecting surfaces (back reflecting mirrors) and is formed of a transparent material such as glass or plastic. The optical element 10 forms on the surface thereof a concave refracting surface (incidence surface) R2 having negative refractive power (=1/focal length), three reflecting surfaces of positive or negative refractive power, i.e., a reflecting surface R3, a reflecting surface R4 and a reflecting surface R5, and a concave refracting surface (emergence surface) R6 having negative refractive power, in the order of passage of the ray of light from an object. R1 designates a stop (entrance pupil) disposed on the object side of the optical element 10. An optical correcting plate (optical block) such as a low-pass filter or an infrared cut filter is usually provided between the emergence surface R6 and the final imaging plane R7, but is not shown in FIGS. 1 and 2.

The final imaging plane R7 has the image pickup surface of an image pickup element (image pickup medium), such as a CCD, located thereon. The photo-taking optical system 1 has the optical element 10 and an optical block (not shown). Reference numeral 11 denotes the reference axis of the photo-taking optical system 1.

Both of the two refracting surfaces R2 and R6 of the optical element 10 comprise rotation-symmetrical spherical surfaces, and all of the reflecting surfaces R3–R5 comprise anamorphic aspherical surfaces symmetrical with respect only to the YZ plane.

The reflecting surface R3 and the reflecting surface R5, as shown in FIG. 2, comprise a portion of the same curved reflecting surface 100, and the reflecting surfaces of their effective reflecting regions partly overlap (are common) each other.

The imaging action in the present embodiment will now be described. A light beam L1 from the object has its quantity of incident light regulated by the stop R1, whereafter it enters the incidence surface R2 of the optical element 10, is reflected by the reflecting surfaces R3, R4 and R5, and thereafter emerges from the emergence surface R6, and is imaged on the final imaging plane R7 through a low-pass filter or an infrared cut filter, not shown.

In the present embodiment, the direction of the reference axis 11 entering the incidence surface R2 of the optical element 10 and the direction of the reference axis emerging from the emergence surface R6 differ from each other. Also, the reference axes including the incidence and emergence axes are all on the plane of the drawing sheet (YZ plane).

Thus, the optical element 10 functions as a lens unit having desired optical performance and having a positive refractive power as a whole by the refractive power by the incidence and emergence surfaces and the refractive power by of a plurality of curved reflecting mirrors therein.

When in each surface in the photo-taking optical system 1, the rays of light emerging from the center of the object surface, the ray of light passing through the center of the stop R1 defined in the photo-taking optical system 1 is defined as the reference axis ray of light, and the reference axis ray of light entering each surface is defined as the incidence reference axis of that surface, and the reference ray of light emerging from each surface is defined as the emergence reference axis of that surface, and the point of intersection between the incidence and emergence reference axes and each surface is defined as the reference point, each reflecting surface is an off-axial reflecting surface in which the incidence and emergence reference axes thereof are inclined with respect to a normal at the reference point.

The optical element 10 comprises an off-axial optical element in which two refracting surfaces and two or more off-axial reflecting surfaces are integrally formed on the surface of a transparent member.

Each reflecting surface is designed by the use of the aforementioned expression (1) so that the refractive power may differ in two surfaces (YZ surface and XZ surface) orthogonal to each other and it may have only one symmetrical surface, and suffers little from eccentric aberration.

In the present embodiment, focusing on a short distance object is effected by moving the entire photo-taking optical system 1 relative to the image pickup surface R7 of the image pickup element.

Figure 3:
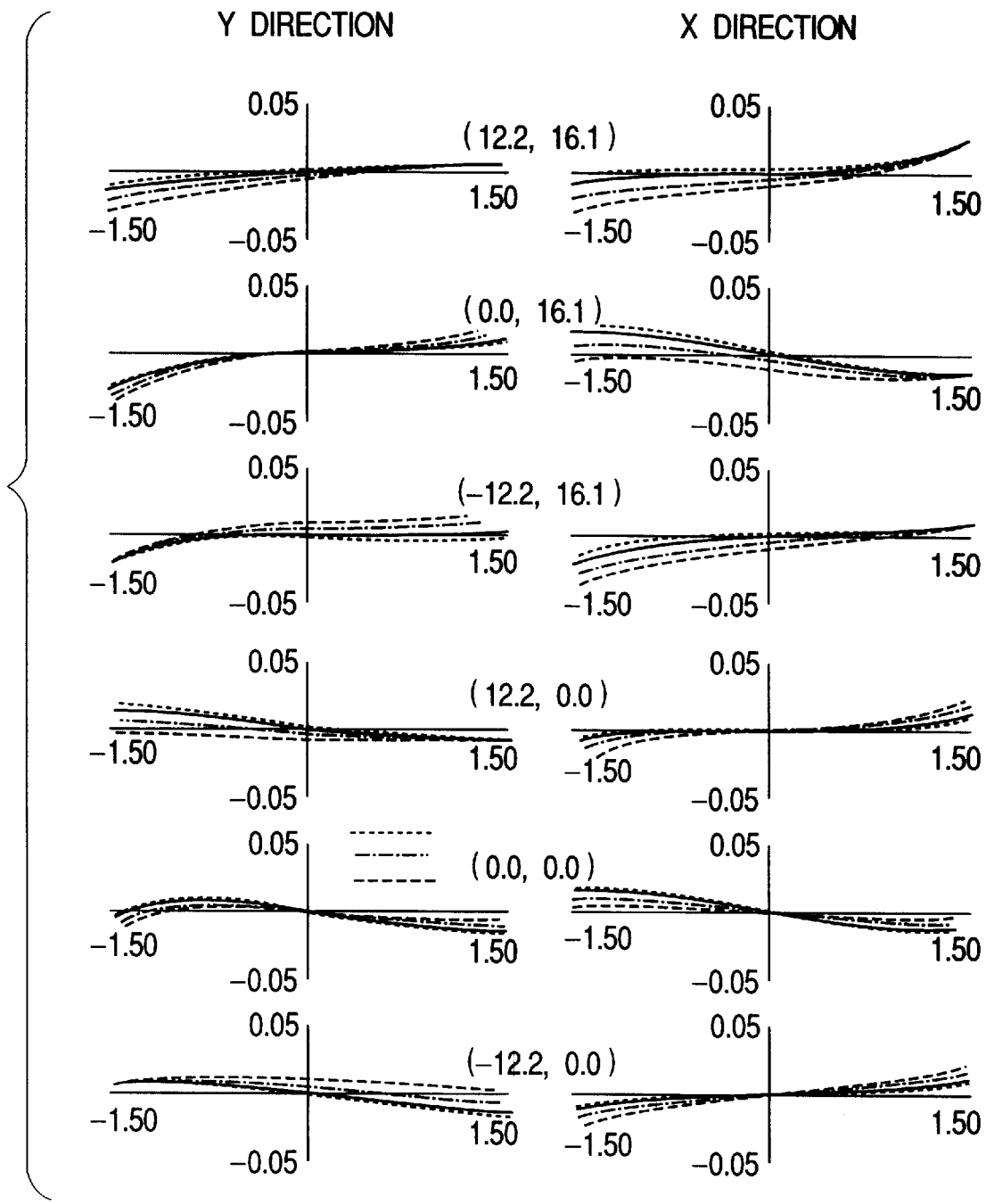
FIG. 3 shows the lateral aberrations of Embodiment 1 of the present invention.

FIG. 3 shows the lateral aberrations of the photo-taking optical system of the present embodiment when the object is at infinity. In the aberration graph, dotted lines represent a C ray, solid lines represent a D ray, and dot-and-dash lines represent an F ray. As shown in FIG. 3, according to the present embodiment, there is obtained a well-balanced aberration corrected state.

The effect of the present embodiment will now be described.

In the present embodiment, the reflecting surface R3 and the reflecting surface R5 are a portion of the same surface. That is, the function expression describing the surface shapes of the surfaces R3 and R5 and the position of the origin of the local coordinates are the same (common). The effective reflecting region during the reflection by the respective surfaces, as shown in FIG. 2, is such that parts of the region overlap each other and the reflecting surfaces thereof are common.

In the present embodiment, the number of the reflecting surfaces of this optical element 1 is two, but the frequency of reflection from after any ray of light has entered the optical element 1 until it emerges therefrom is three times.

Thus, the optical element 1 functions as a lens unit having an imaging action as a whole by the refractive power of the incidence and emergence surfaces R2 and R6 and the plurality of curved reflecting mirrors therein, and the effective regions of the reflecting surfaces are superposed one upon another to thereby use the reflecting surfaces efficiently, thus achieving a compact optical element.

Figure 4:
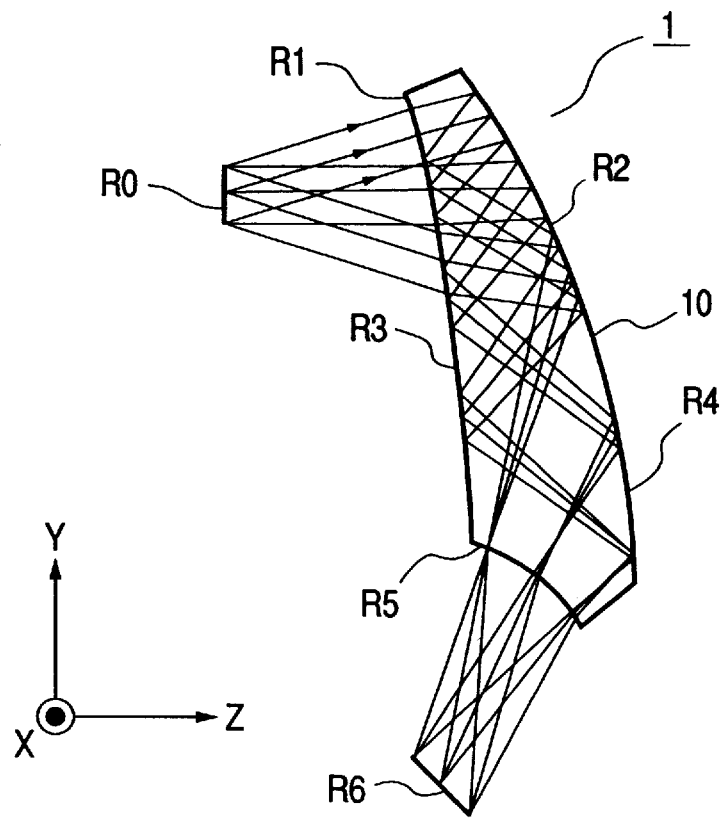
FIG. 4 is a schematic view of the YZ cross-section of Embodiment 2 of the present invention.
Figure 5:
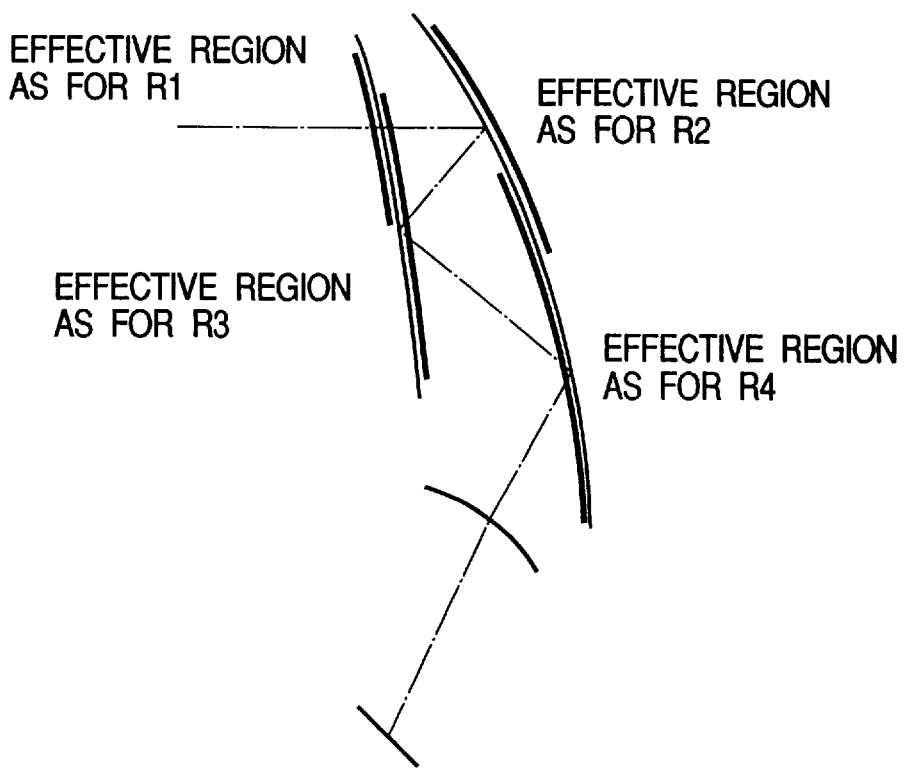
FIG. 5 is a schematic view of the YZ cross-section of Embodiment 2 of the present invention.

FIGS. 4 and 5 are schematic views of Embodiment 2 of the photo-taking optical system of the present invention in YZ cross-section.

In the embodiment 2, there is provided a telecentric optical system at the object side and the photo-taking range is made such that the horizontal object height is 1.3 and the vertical object height is 1.0.

In FIGS. 4 and 5, reference numeral 1 designates the photo-taking optical system. Reference numeral 10 denotes an optical element having a plurality of curved reflecting surfaces that is formed of a transparent material, such as glass or plastic. The optical element 10 forms on the surface thereof a concave refracting surface (incidence surface) R1 having a negative refractive power, three reflecting surfaces of a positive or a negative refractive power, i.e., a reflecting surface R2, a reflecting surface R3 and a reflecting surface R4, and a concave refracting surface (emergence surface) R5 having a negative refractive power, in the order of passage of a ray of light from an object. R0 designates the object surface, and R6 denotes a final imaging plane on which is located the image pickup surface of an image pickup element such as a CCD.

In FIGS. 4 and 5, a ray of light coming from the object side R0 is refracted by the refracting surface R1, is reflected by the reflecting surface R2, the reflecting surface R3 and the reflecting surface R4 in succession, is refracted by the refracting surface (emergence surface) R5, and is imaged on the imaging plane R6.

In the present embodiment, the reflecting surface R2 and the reflecting surface R4 are portions of the same surface. The effective region during the reflection by the surface R2 and the surface R4, as shown in FIG. 5, is such that parts of the area overlap each other. Also, the refracting surface R1 and the reflecting surface R3 are portions of the same surface, but the effective region, as shown in FIG. 5, is such that parts thereof overlap each other.

Figure 6:
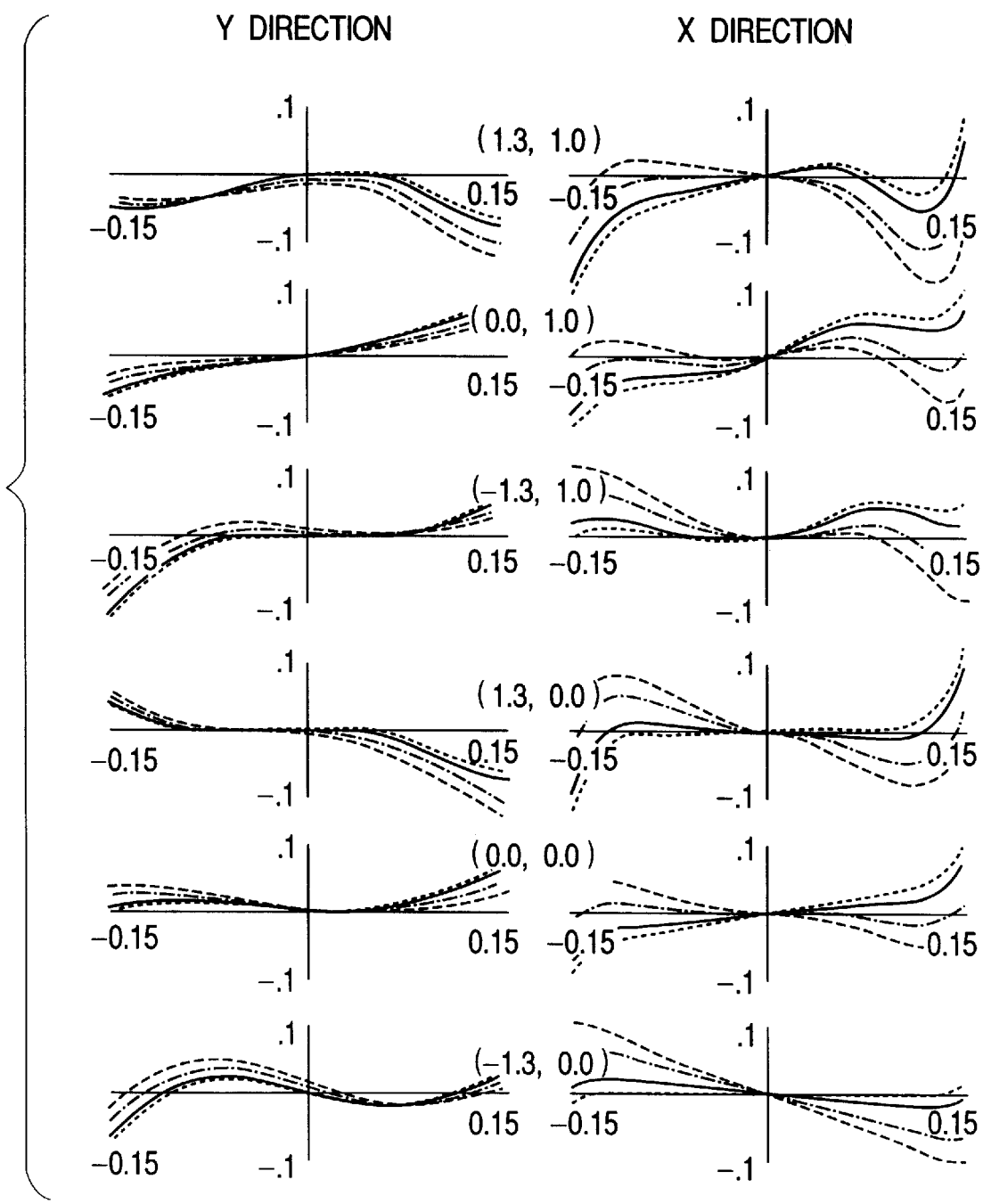
FIG. 6 shows the lateral aberrations of Embodiment 2 of the present invention.

Also, the lateral aberrations of the photo-taking optical system of the present embodiment are shown in FIG. 6. Only in the present embodiment, in the lateral aberration graph, the abscissas axis represents the object side numerical value opening (numerical aperture).

Figure 7:
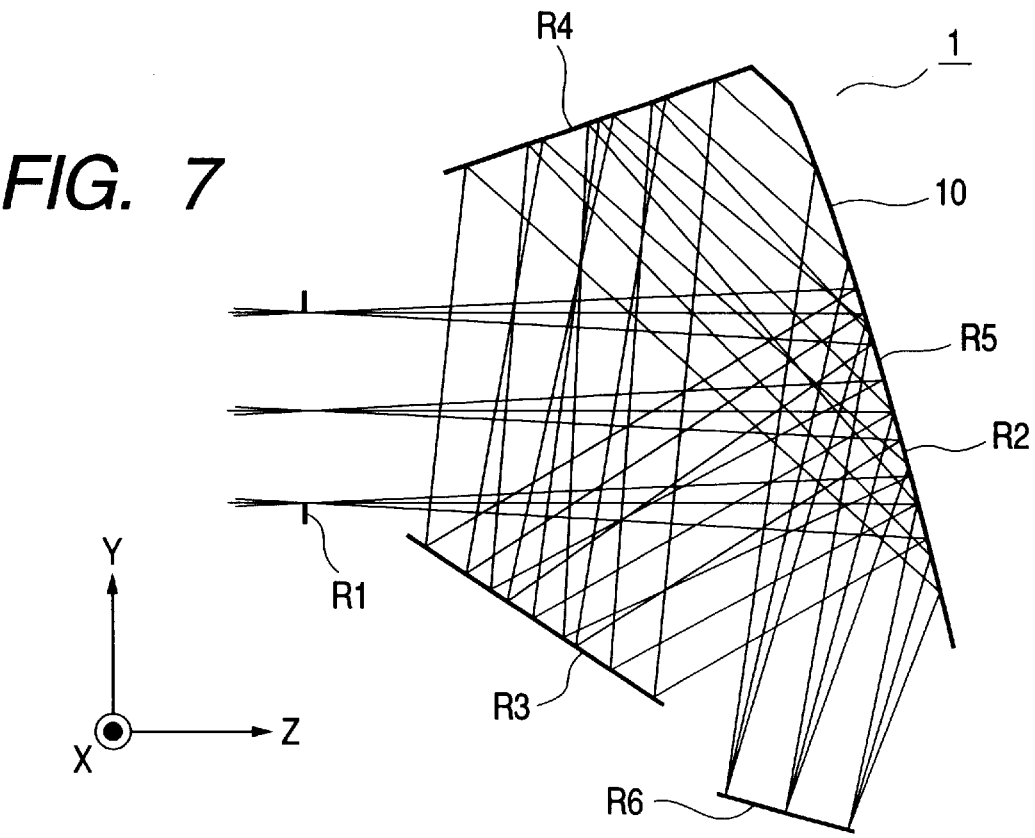
FIG. 7 is a schematic view of the YZ cross-section of Embodiment 3 of the present invention.
Figure 8:
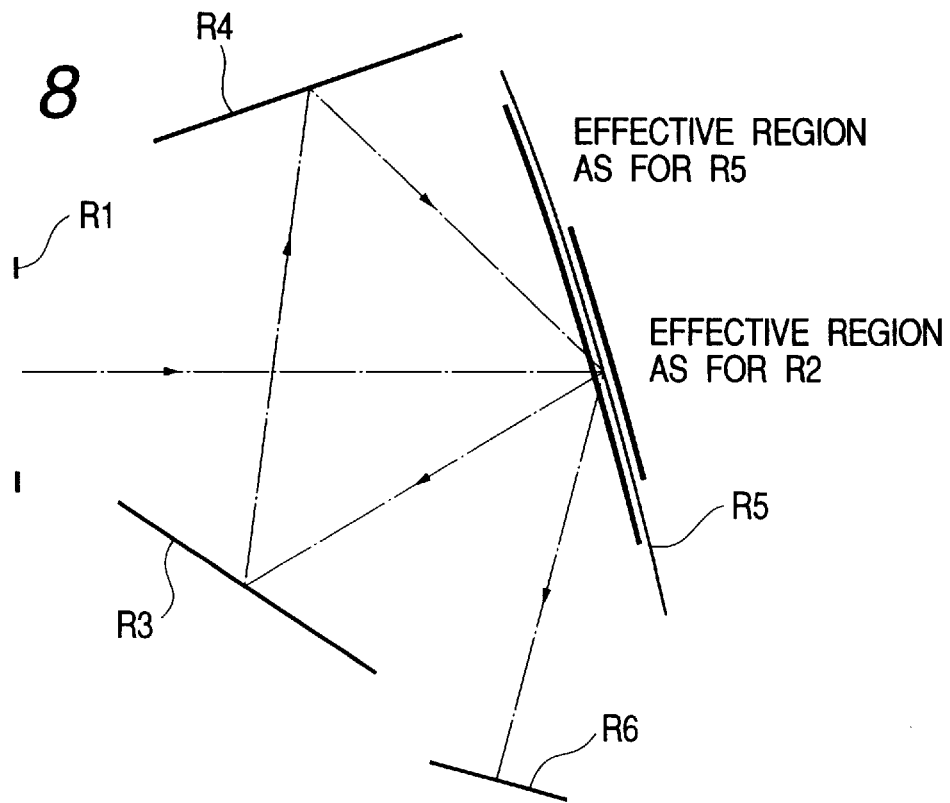
FIG. 8 is a schematic view of the YZ cross-section of Embodiment 3 of the present invention.

FIGS. 7 and 8 are schematic views of Embodiment 3 of the photo-taking optical system of the present invention in YZ cross-section. In the Embodiment 3, the photo-taking angle of view is made such that a horizontal half angle of view is 3 degrees and a vertical half angle of view is 4 degrees.

In FIGS. 7 and 8, reference numeral 1 designates the photo-taking optical system. Reference numeral 10 denotes an optical element having a plurality of curved reflecting surfaces (surface reflecting mirrors). The optical element 10 forms four reflecting surfaces of positive or negative refractive power, i.e., a reflecting surface R2, a reflecting surface R3, a reflecting surface R4 and a reflecting surface R5 in the order of passage of a ray of light from an object. R1 designates a stop (entrance pupil) disposed on the object side of the optical element 10, and R6 denotes a final imaging plane.

In FIGS. 7 and 8, a ray of light coming from the object side passes through the stop R1, is reflected by the reflecting surfaces R2, R3, R4 and R5, and is imaged on the imaging plane R6. In the present embodiment, the reflecting surface R2 and the reflecting surface R5 are portions of the same surface. The effective regions of the surface R2 and the surface R5 during reflection, as shown in FIG. 8, are such that parts of the regions overlap each other.

Also, in the present embodiment, the reference point (reference axis (ray) incidence position) of the reflecting surface R2 and the reference point (reference axis (ray) incidence position) of the reflecting surface R5 coincide with each other. That is, the reference axis ray is reflected twice at a certain point on a certain reflecting surface at different angles of incidence.

In the present embodiment, the number of the reflecting surfaces of this optical element 10 is three, but the frequency of the reflection from after the ray of light has entered the optical element 10 until it emerges therefrom is four times.

Figure 9:
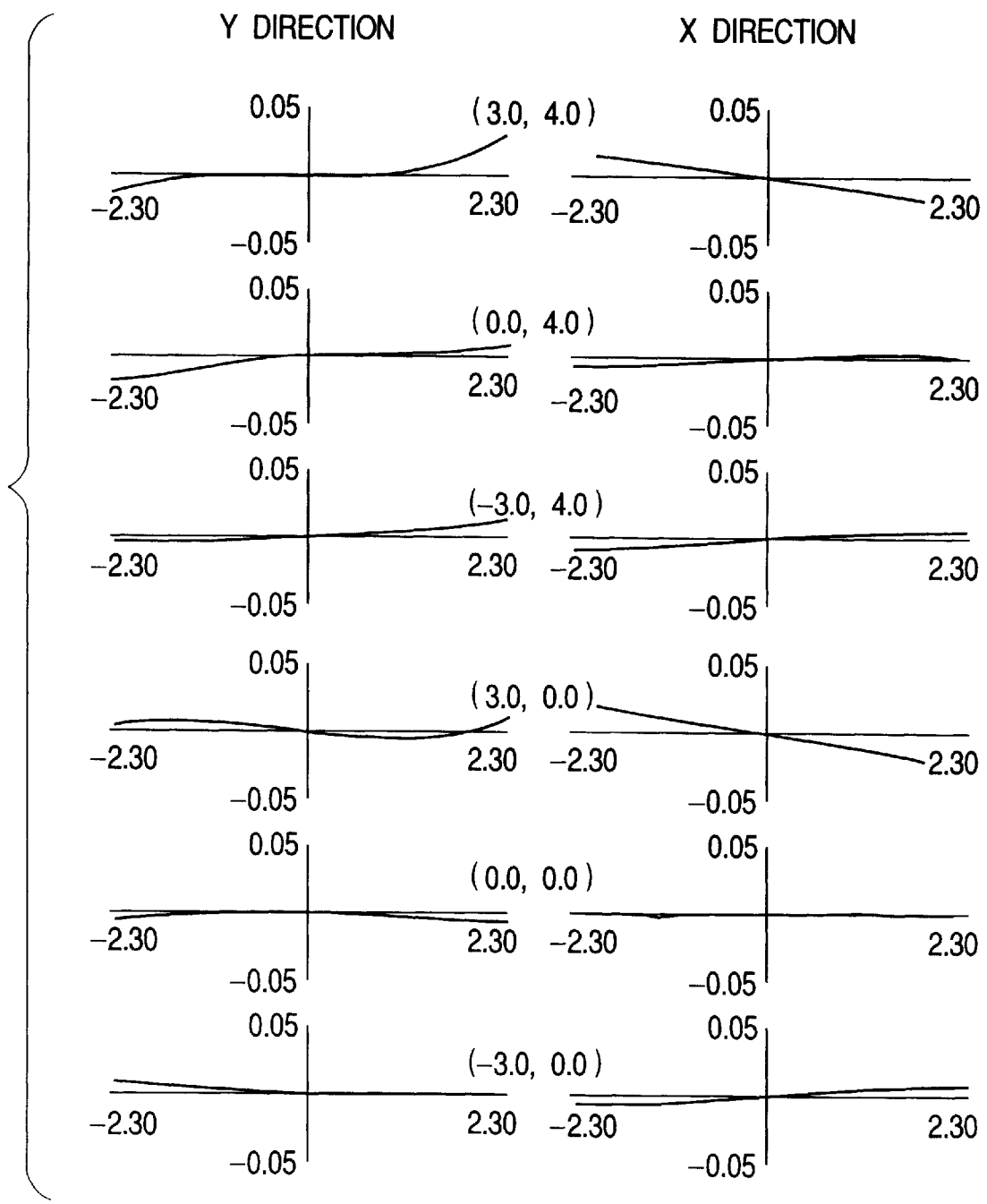
FIG. 9 shows the lateral aberrations of Embodiment 3 of the present invention.

The lateral aberrations of the photo-taking optical system of the present embodiment are shown in FIG. 9. The optical system shown in FIGS. 7 and 8, similarly to the cases of FIGS. 1 and 2 and FIGS. 4 and 5, can assume a form in which a reflecting surface is provided on a glass or plastic surface and light is propagated through the interior of this transparent material.

The above-described embodiment has been shown with respect to an optical system constructed by the use of only one off-axial optical element having a reflecting surface reflecting a light beam twice in the same region, but the optical system of the present invention is not restricted thereto. For example, a plurality of off-axial optical elements may be used or an off-axial optical element may be combined with an ordinary optical element to thereby construct an optical system.

The optical element of the present invention is applicable not only to a photo-taking optical system, but also to various optical systems, such as an observation optical system and a measuring optical system.

Some numerical value embodiments of the present invention will be shown below.

Numerical Value Embodiment 1 horizontal half angle of view 12.2 (deg.)
vertical half angle of view 16.1 (deg.)
stop diameter 3.0
image size 4.6 × 6.2
optical system size 10.6 × 18.6 × 15.1

| i | Yi | Zi | $\Theta i$ | Ndi | vdi | |
|---|------|-------|--------|--------|-------|---------------------|
| 1 | 0.00 | 0.00  | 0.00   | 1      |       | stop |
| 2 | 0.00 | 3.00  | 0.00   | 1.49171| 57.40 | refracting surface |
| 3 | 0.00 | 12.50 | 25.00  | 1.49171| 57.40 | reflecting surface |
| 4 | −5.36| 8.00  | 65.00  | 1.49171| 57.40 | reflecting surface |
| 5 | 0.00 | 12.50 | 25.00  | 1.49171| 57.40 | reflecting surface (identical to surface R3) |
| 6 | 7.61 | 3.93  | −22.88 | 1      |       | refracting surface |
| 7 | 9.17 | 0.24  | −22.88 | 1      |       | image plane | spherical shape
surface R2 r2 = −9.327
surface R6 r6 = −18.275
aspherical shape
surface R3
C02 = −6.75929e − 03   C20 = −1.30773e − 02
C03 = 1.82596e − 04    C21 = 4.11468e − 04
C04 = −2.55821e − 06   C22 = −1.65332e − 05   C40 = 1.41646e − 05
C05 = −8.68265e − 08   C23 = 5.55654e − 11    C41 = −1.12165e − 06
surface R4
C02 = 7.90687e − 03    C20 = 2.96748e − 03
C03 = 5.08548e − 04    C21 = 7.37020e − 04
C04 = −3.40101e − 05   C22 = −5.57552e − 05   C40 = 1.13350e − 05
C05 = 1.84673e − 06    C23 = 3.45965e − 06    C41 = −6.39160e − 07
surface R5 (identical to surface r3)

Numerical Value Embodiment 2 horizontal object height 1.3
vertical object height 1.0
object side NA 0.30
optical system size 9.8 × 33.4 × 10.4

| i | Yi    | Zi    | $\Theta i$ | Ndi    | vdi   | |
|---|-------|-------|--------|--------|-------|---------------------|
| 0 | 0.00  | 0.00  | 0.00   | 1      |       | object surface |
| 1 | −9.50 | 10.38 | 6.00   | 1.62000| 60.30 | refracting surface |
| 2 | −9.00 | 17.36 | 14.00  | 1.62000| 60.30 | reflecting surface |
| 3 | −9.50 | 10.38 | 6.00   | 1.62000| 60.30 | total reflecting surface (identical to surface R1) |
| 4 | −9.00 | 17.36 | 14.00  | 1.62000| 60.30 | reflecting surface (identical to surface R2) |
| 5 | −12.60| 5.63  | 39.65  | 1      |       | refracting surface |
| 6 | −27.19| 9.47  | 44.61  | 1      |       | image plane | aspherical shape
surface R1
C02 = 1.91744e − 04    C20 = −1.04633e − 02
C03 = −1.27492e − 04   C21 = −2.59627e − 03
C04 = 1.32355e − 05    C22 = −4.25904e − 06   C40 = −9.27502e − 05
C05 = −2.72566e − 09   C23 = −4.65148e − 08   C41 = −8.90157e − 07
surface R2
C02 = −1.13909e − 02   C20 = −1.45347e − 02
C03 = 1.59333e − 05    C21 = −1.62184e − 03

-continued

C04 = −5.73381e − 06   C22 = 2.89604e − 05    C40 = 1.39684e − 06
C05 = 7.78702e − 10    C23 = −2.30596e − 08   C41 = −2.80683e − 08
surface R3 (identical to surface R1)
surface R4 (identical to surface R2)
surface R5
C02 = 9.46092e − 02    C20 = 4.85706e − 02
C03 = 6.27350e − 03    C21 = 1.49495e − 04
C04 = 3.76912e − 05    C22 = 1.65296e − 04    C40 = −1.49041e − 04
C05 = −3.75202e − 11   C23 = 1.31138e − 09    C41 = 6.61735e − 09

Numerical Value Embodiment 3 horizontal half angle of view 3.0 (deg.)
vertical half angle of view 4.0 (deg.)
stop diameter 4.60
image size 2 × 2.6
optical system size 9.8 × 18.0 × 15.1

| i | Yi    | Zi    | $\Theta i$ | Di    | Ndi | vdi |
|---|-------|-------|--------|-------|-----|-----|
| 1 | 0.00  | 0.00  | 0.00   | 14.00 | 1   | stop |
| 2 | 0.00  | 14.00 | 15.00  | 10.00 | 1   | reflecting surface |
| 3 | −5.00 | 5.34  | 55.92  | 12.00 | 1   | reflecting surface |
| 4 | 6.88  | 7.04  | 71.41  | 9.78  | 1   | reflecting surface |
| 5 | 0.00  | 14.00 | 15.00  | 10.00 | 1   | reflecting surface (identical to surface R2) |
| 6 | −9.64 | 11.36 | −74.71 |       | 1   | image plane | aspherical shape
surface R2
C02 = −4.86013e − 03   C20 = −4.11288e − 03
C03 = −1.94648e − 04   C21 = −3.10656e − 06
surface R3
C02 = 2.18671e − 04    C20 = 3.22588e − 03
C03 = −5.96159e − 04   C21 = 7.79411e − 06
C04 = −4.23416e − 05   C22 = 1.08687e − 05    C40 = −8.05772e − 06
surface R4
C02 = 0.00000e + 00    C20 = 0.00000e + 00
C03 = −1.22418e − 03   C21 = −1.13943e − 04
C04 = 5.16406e − 05    C22 = 2.80217e − 05    C40 = −2.03231e − 05
surface R5 (identical to surface R2)

According to each of the above-described embodiments, a plurality of effective reflecting regions are partly superposed one upon another and therefore, the space or the reflecting surfaces can be effectively used, and this is effective for making the entire optical system compact. Further, the refracting surfaces and the reflecting surfaces are partly superposed one upon another and therefore, it is possible to make the entire optical system more compact.

What is claimed is:

1. An optical element comprising:
   a plurality of reflecting regions for reflecting light beam in succession from an incident surface into an emergent surface of said optical element, said light beam has a reference axis which passes through center of a pupil;
   wherein at least two of said reflecting regions have a common reflecting surface, and
   wherein an optical path of said reference axis of said light beam of said optical element intersects itself within said optical element.

2. An optical element according to claim 1, wherein said plurality of reflecting regions are provided on the surface of a transparent member, and light having entered an interior of said transparent member for a certain region of said transparent member is reflected by said plurality of reflecting regions in succession and propagates through the interior of said transparent member, and thereafter emerges from another region of said transparent member.

3. An optical element according to claim 1, wherein positions of reference axes of said at least two reflecting regions having said common reflecting surface coincide with each other.

4. An optical element comprising:

a plurality of reflecting regions for reflecting a light beam in succession from an incident surface into an emergent surface of said optical element, said light beam has a reference axis which passes through center of a pupil;

wherein at least two of said reflecting regions have a common reflecting surface, wherein an optical path of said reference axis of said light beam of said optical element intersects itself within said optical element, and wherein each reflecting, surface constituting, said plurality of reflecting regions is an aspherical surface inclined with respect to the reference axis and has not more than two symmetrical planes each capable of defining a pair of surfaces symmetrical with respect to the reference axis.

5. An optical element according to claim 4, wherein said plurality of reflecting regions are provided on the surface of a transparent member, and light having entered an interior of said transparent member from a certain region of said transparent member is reflected by said plurality of reflecting regions in succession and propagates through the interior of said transparent member, and thereafter emerges from another region of said transparent member.

6. An optical element according to claim 4, wherein positions of reference axes on said at least two reflecting regions having said common reflecting surface coincide with each other.

7. An optical element according to claim 4, wherein a shape of the reflecting surfaces in said reflecting regions is represented by the following expression:

assuming that $A=(a+b)\cdot(y^2\cdot\cos^2 t+x^2)$ $B=2a\cdot b\cdot\cos t[1+\{(b-a)\cdot y\cdot\sin t/(2a\cdot b)\}+$ $[1+\{(b-a)\cdot y\cdot\sin t/(a\cdot b)\}-\{y^2/(a\cdot b)\}-\{4a\cdot b\cdot\cos^2 t+(a+b)^2 \sin^2 t\}x^2/(4a^2b^2 \cos^2 t)]^{1/2}]$, $z=A/B+C02y^2+C11xy+C20x^2+C03y^3+C12xy^2+C21x^2y+C04y^4+C13xy^3+C22x^2y^2+C31x^3y+C40x^430\ldots$ 8. An optical element according to claim 7, wherein the shape of the reflecting surfaces in said reflecting regions is designed on the basis of the following expression:

assuming that $A=(a+b)\cdot(y^2\cdot\cos^2 t+x^2)$ $B=2a\cdot b\cdot\cos t[1+\{(b-a)\cdot y\cdot\sin t/(2a\cdot b)\}+[1+\{$ $(b-a)\cdot y\cdot\sin t/(a\cdot b)\}-\{y^2/(a\cdot b)\}-\{4a\cdot b\cdot\cos^2 t+(a+b)^2 \sin^2 t\}x^2/(4a^2b^2 \cos^2 t)]^{1/2}]$, $z=A/B+C02y^2+C11xy+C20x^2+C03y^3+C12xy^2+C21x^2y+C04y^4+C13xy^3+C22x^2y^2+C31x^3y+C40x^4+\ldots$ 9. An optical system having one or more optical elements of any one of claims 1 to 8.

10. An apparatus having one or more optical elements of any one of claims 1 to 8.

11. An apparatus according to claim 10, wherein said one or more optical elements are the constituents of an optical system for photographing, observation or measurement.

* * * * *

UNITED STATES PATENT AND TRADEMARK OFFICE
CERTIFICATE OF CORRECTION

PATENT NO. : 6,120,156
DATED : September 19, 2000
INVENTOR(S) : Takeshi Akiyama

It is certified that error appears in the above-identified patent and that said Letters Patent is hereby corrected as shown below:

Title page,
Item [57], ABSTRACT,
Line 4, "has" should read -- have --.

Column 2,
Line 47, "which are and a porro prism" should read -- and a porro prism, which are --.
Line 51, "good" should be deleted.

Column 4,
Line 65, "which" should be deleted.
Line 67, "the" should be deleted.

Column 5,
Line 1, "path" should read -- paths --.
Line 3, "itself" should be deleted.
Line 6, "the" should be deleted.

Column 8,
Line 33, "pl y-axis:" should read -- ¶ y-axis: --.
Line 36, "Z-axis;" should read -- z-axis; and --.

Column 9,
Line 56, "abscissas" should read -- abscissa --.

Column 10,
Line 39, "(are common)" should read -- (are common to) --.

UNITED STATES PATENT AND TRADEMARK OFFICE
CERTIFICATE OF CORRECTION

PATENT NO. : 6,120,156
DATED : September 19, 2000
INVENTOR(S) : Takeshi Akiyama

It is certified that error appears in the above-identified patent and that said Letters Patent is hereby corrected as shown below:

<u>Column 15,</u>
Line 11, "reflecting," should read -- reflecting --; and "constituting," should read -- constituting --.

Signed and Sealed this

Twelfth Day of March, 2002

Attest:

Attesting Officer

JAMES E. ROGAN
Director of the United States Patent and Trademark Office